United States Patent
Vorobyev et al.

(10) Patent No.: US 9,982,107 B1
(45) Date of Patent: May 29, 2018

(54) METHOD OF DEVULCANIZATION OF SULFUR-CURED RUBBER

(71) Applicant: Rubbintec, SIA, Jurmala (LV)

(72) Inventors: Leonid R. Vorobyev, Walnut Creek, CA (US); Vladimir Borisovich Bosnik, Moscow (RU)

(73) Assignee: Rubbintec, SIA, Jurmala (LV)

( * ) Notice: Subject to any disclaimer, the term of this patent is extended or adjusted under 35 U.S.C. 154(b) by 0 days. days.

(21) Appl. No.: 15/569,177

(22) PCT Filed: Apr. 15, 2016

(86) PCT No.: PCT/IB2016/052152
  § 371 (c)(1),
  (2) Date: Oct. 25, 2017

(87) PCT Pub. No.: WO2016/174539
  PCT Pub. Date: Nov. 3, 2016

(30) Foreign Application Priority Data

Apr. 28, 2015 (EP) ..................... 15165489

(51) Int. Cl.
  *C08J 11/10* (2006.01)
  *C08J 11/18* (2006.01)
  *C08J 11/28* (2006.01)

(52) U.S. Cl.
  CPC ............ *C08J 11/28* (2013.01); *C08J 2321/00* (2013.01)

(58) Field of Classification Search
  CPC ... C08J 11/10; C08J 11/18; C08J 11/28; C08J 2309/00; C08J 2309/06; C08J 2317/00; C08J 2321/00
  USPC ........................ 521/41.5, 42, 44.5
  See application file for complete search history.

(56) References Cited

U.S. PATENT DOCUMENTS

| | | | |
|---|---|---|---|
| 4,211,676 A | | 7/1980 | Watabe et al. |
| 4,426,459 A | * | 1/1984 | Watabe .................. C08J 11/22 521/42 |
| 5,602,186 A | | 2/1997 | Myers et al. |

FOREIGN PATENT DOCUMENTS

| | | |
|---|---|---|
| EP | 2796491 A1 * | 10/2014 |
| SU | 175645 | 10/1965 |

OTHER PUBLICATIONS

Rajan et al., Prog. Polym. Sci. 31 (2006) 811-834.*
European Search Report in related application EP 15165489, dated May 2015.
Kannan Ganesh and Kaushal Kishore "Chemical Degradation of Poly(styrene disulfide) and Poly(styrene tetrasulfide) by Triphenylphosphine" (Macromolecules, 1995, 28(7), pp. 2483-2490), ISSN 0024-9297, DOI: 10.1021/ma00111a049.
Mitsuru Ueda et al: "Synthesis of poly(ether-ketone-amide)s by palladium-catalyzed polycondensation of aromatic dibromides containing ether ketone structure, aromatic diamines, and carbon monoxide", Journal of Polymer Science Part A: Polymer Chemistry, vol. 32, No. 11, Aug. 1, 1994 (Aug. 1, 1994), pp. 2065-2071, XP055189783, ISSN: 0887-624X, DOI: 10.1002/pola.1994.080321108.
Yamashita S: "Reclaimed rubber from rubber scrap (2)", International Polymer Science and Technology, Rapra Technology, Shrewabury, GB, vol. 8, No. 12, Jan. 1, 1981 (Jan. 1, 1981), pp. T/77-T/93, XP009137997, ISSN: 0307-174X.

* cited by examiner

*Primary Examiner* — Roberto Rabago
(74) *Attorney, Agent, or Firm* — Smartpat PLC

(57) ABSTRACT

This invention relates to a composition for devulcanization of sulfur-cured rubber and a method of devulcanization of sulfur-cured rubber, and can be used to recycle used rubber articles. The composition for devulcanization of sulfur-cured rubber, which contains a devulcanizing agent for the selective destruction of sulfide bonds according to this invention, has a mixture of triphenylphosphine and 1,8-diazabicyclo[5.4.0]undec-7-ene at a weight ratio from 5:1 to 1:5 as the devulcanizing agent. Further, it contains a compatibilizer compatible with both the devulcanizing agent and the sulfur-cured rubber, at a weight ratio of the devulcanizing agent to the compatibilizer from 1:15 to 1:70. The devulcanizing agent breaks sulfide bonds in sulfur-cured rubber very effectively and selectively, while the experimentally selected compatibilizer ensures an effective penetration of the devulcanizing agent into the rubber crumbs. As a consequence, the required concentration of the devulcanizing agent in the resulting compounded rubber does not exceed 1% (preferably, 0.03-0.3%).

2 Claims, No Drawings

METHOD OF DEVULCANIZATION OF SULFUR-CURED RUBBER

This invention relates to a method of devulcanization using a composition of chemicals for devulcanization of sulfur-cured rubber. It can be used to recycle used rubber articles.

Conventional sulfur vulcanization of rubber leads to the cross-linking of crude rubber macromolecules by sulfide (C—S) and disulfide (S—S) bonds. To reuse this vulcanized rubber while maximally keeping mechanical and other properties of the produced secondary rubber, those sulfide and disulfide bonds (further both called simply sulfide bonds) have to be broken. At the same time, C—C bonds of the main polymer chain have to be kept intact to the highest extent possible.

The U.S. Pat. No. 4,211,676 offers to employ as devulcanizing agents 1,8-diazabicyclo[5.4.0]undec-7-ene (DBU), also known as 2,3,4,6,7,8,9,10-octahydropyrimido[1,2-a]azepine, phenol salts of DBU, carboxylic acid salts of DBU, thiuramsulfide compounds, aromatic sulfides, benzene sulfinic acid compounds, or benzyl sulfonyl hydrazides. The EP Application EP 2796491 A1 20141029 also offers to use DBU for devulcanization.

The DBU devulcanizing agent selectively breaks sulfide bonds, while minimally affecting C—C bonds. This saves the molecular weight of the polymer much better than thermal devulcanization does. However, DBU, while breaking sulfide bonds, also activates vulcanization. Since effective devulcanization requires the addition of significant amounts of DBU (0.3-1%), the resulting secondary compounded rubber has a high tendency for scorching. This significantly complicates rubber processing. Fast scorching results in a big increase of viscosity, followed by the premature cross-linking of macromolecules. As a consequence of fast scorching, it becomes difficult or impossible to achieve necessary shapes and properties of rubber articles.

Usually, scorching time is defined as the time necessary for a 5% increase of compounded rubber viscosity at 120° C. Rubber technologists consider scorching time of at least 8 minutes as acceptable. The common rubber technologies use compounded rubbers with scorching times 15-25 minutes. The secondary compounded rubber produced with the help of DBU from the used sulfur-cured rubber has the scorching time 6-11 minutes.

Kannan Ganesh and Kaushal Kishore in the paper "Chemical Degradation of Poly(styrene disulfide) and Poly(styrene tetrasulfide) by Triphenylphosphine" (Macromolecules, 1995, 28(7), pp. 2483-2490) described the interaction of triphenylphosphine (TPP) with disulfide bonds leading to the break of those bonds or transfer of sulfur atoms. However, they didn't try to use TPP as a devulcanizing agent for sulfur-cured rubber.

A technical problem to be solved by the present invention is the effective devulcanization of the used rubber articles, while maximally keeping the mechanical properties of rubber and producing secondary compounded rubber with technological characteristics (primarily scorching times) similar to common compounded rubbers.

While testing TPP as the devulcanizing agent for sulfur-cured rubber, we found that it is not as effective in keeping the mechanical properties of rubber but allows making secondary compounded rubber with high scorching time.

A composition for devulcanization of sulfur-cured rubber used in the present invention contains a devulcanizing agent for selective destruction of sulfide bonds being a mixture of 1,8-diazabicyclo[5.4.0]undec-7-ene (DBU) and triphenylphosphine (TPP) at a weight ratio of DBU to TPP from 5:1 to 1:5 and further contains a compatibilizer compatible with both the devulcanizing agent and the sulfur-cured rubber, at a weight ratio of the devulcanizing agent to the compatibilizer from 1:15 to 1:70. The mixture of DBU and TPP breaks sulfide bonds in sulfur-cured rubbers very effectively and selectively, as DBU and TPP work synergistically, showing together higher effectiveness than each one alone. The role of the compatibilizer in this composition is to help the devulcanizing agent to penetrate into rubber crumbs made from used sulfur-cured rubber articles. High-boiling products of petroleum distillation, comprising a complex mixture of hydrocarbons (primarily alkylaromatic), are well compatible with the mixture of TPP and DBU. At the same time, they are compatible with the rubber crumbs, which are mostly based on polyisoprene, polybutadiene, and other low polar rubbers. As a result, the composition of invention can penetrate into the rubber crumbs relatively easily, resulting in the effective and uniform devulcanization of sulfur-cured rubber.

The devulcanizing agent is the mixture of 1,8-diazabicyclo[5.4.0]undec-7-ene (DBU) and triphenylphosphine (TPP) at a weight ratio from 5:1 to 1:5.

Preferably, the compatibilizer is selected from petroleum-based aromatic oils. The compatibilizer may be chosen from the products of petroleum distillation with boiling temperatures exceeding 250° C., in order to minimize the evaporation of the compatibilizer in the technological process.

The claimed method of devulcanization of sulfur-cured rubber includes mixing the described composition for devulcanization of sulfur-cured rubber with the rubber crumbs at a weight ratio of the composition to the rubber crumbs from 1:9 to 1:60, followed by the extrusion of this mixture at 40-120° C. The devulcanizing agent breaks sulfide bonds of sulfur-cured rubber very effectively and selectively, while the experimentally selected compatibilizer ensures effective penetration of the devulcanizing agent into the rubber crumbs. As a consequence, the required concentration of the devulcanizing agent in the resulting secondary compounded rubber does not exceed 1% (preferably, 0.03-0.3%). The scorching time of the secondary compounded rubber at that low concentration of the devulcanizing agent is 14-23 minutes. This is a normal range of the scorching time for practically all rubber processing technologies.

The heating and shear during extrusion contribute to the penetration of the composition for devulcanization of sulfur-cured rubber into the rubber crumbs, significantly easing and accelerating the process of devulcanization. The material after extrusion can be used for the production of rubber articles "as is" or in combination with the standard compounded rubbers.

The devulcanized rubber crumbs are 100% soluble (except carbon black) in toluene, confirming the high effectiveness of devulcanization. The properties of the test samples (made from secondary compounded rubber based on the devulcanized rubber crumbs) are close to the properties of the original rubbers. This proves high selectivity of devulcanization that kept properties of the secondary vulcanized rubber at 70-90% of those of the original. The tear resistance was especially high, reaching 60-120 kN/m, which equals and even exceeds this parameter for original rubbers.

The following are specific examples of the implementation of the present invention, which are preferable but not the only possible.

EXAMPLE 1

0.3 kg of a devulcanizing agent consisting of mixture of DBU and TPP (ratio by weight 1:1) and 10 kg of the petroleum-based oil Viplex 530A (boiling range 320-500° C., liquid at mixing temperature 25° C.) were mixed in a 20 liter plastic pail by a blade mixer for 5 minutes at 150 rotations per minute (rpm). A weight ratio of the devulcanizing agent to the compatibilizer was 1:33.3. The resulting uniform composition was added to 120 kg of rubber crumbs (average particle size 0.5 mm; produced from used rubber tires and cleaned from metal particles) on the Ross mixer (capacity 500 liters; speed 30 rpm) and mixed for 20 minutes. This mixture was loaded into an NRM extruder (screw diameter=4.5 inches). The three heating zones of the extruder had the following temperatures: zone I—45° C.; zone II—55° C.; zone III—65° C. At the end of the extruder, the mixture exited through flat holes 1.5 mm thick, which created the resistance necessary for effective shearing.

To study the properties of the resulting devulcanized rubber, it was mixed with powdered sulfur and the activator of vulcanization dibenzothiazoledisulfide (DBTD) at a weight ratio of the devulcanized rubber to sulfur to DBTD 100:1:0.5 using mixing rubber rolls (rolls diameter 300 mm, rolls speed ratio 1:1.14). To make test samples, this secondary compounded rubber was vulcanized in an electrical press at 140° C. for 15 minutes. The test results are given in Table 1 (P-1).

EXAMPLE 2

The composition for devulcanization of sulfur-cured rubber was made and used exactly as described in Example 1 except that 0.15 kg of mixture of DBU and TPP (ratio by weight 1:1) was used as a devulcanizing agent. A weight ratio of the devulcanizing agent to the compatibilizer was 1:66.7.

The resulting devulcanized rubber was tested as described in Example 1. The test results are given in Table 1 (P-2).

EXAMPLE 3

The composition for devulcanization of sulfur-cured rubber was made and used exactly as described in Example 1 except that 0.3 kg of mixture of DBU and TPP (ratio by weight 5:1) was used as a devulcanizing agent.

The resulting devulcanized rubber was tested as described in Example 1. The test results are given in Table 1 (P-3).

EXAMPLE 4

The composition for devulcanization of sulfur-cured rubber was made and used exactly as described in Example 1 except that 0.3 kg of mixture of DBU and TPP (ratio by weight 1:5) was used as a devulcanizing agent.

The resulting devulcanized rubber was tested as described in Example 1. The test results are given in Table 1 (P-4).

EXAMPLE 5

The composition for devulcanization of sulfur-cured rubber was made and used exactly as described in Example 1 except that 0.3 kg of TPP was used as a devulcanizing agent.

The resulting devulcanized rubber was tested as described in Example 1. The test results are given in Table 1 (P-5).

EXAMPLE 6

The composition for devulcanization of sulfur-cured rubber was made and used exactly as described in Example 1 except that 0.3 kg of DBU was used as a devulcanizing agent.

The resulting devulcanized rubber was tested as described in Example 1. The test results are given in Table 1 (P-6).

EXAMPLE 7

This example illustrates the real effect of a devulcanizing agent.

10 kg of Viplex 530A (without the devulcanizing agent) was added to 120 kg of rubber crumbs and extruded as described in Example 1.

The extruded rubber was tested as described in Example 1. The test results are given in Table 1 (P-7).

TABLE 1

The characteristics of the tested rubbers.

| Characteristics | P-1 | P-2 | P-3 | P-4 | P-5 | P-6 | P-7 |
|---|---|---|---|---|---|---|---|
| Scorching time* 120° C. $t_5$, minutes | 16 | 20 | 13 | 18 | 16 | 11 | >25 |
| Modulus at 100% elongation, MPa | 2.53 | 2.56 | 2.44 | 2.54 | 1.95 | 2.42 | 0.86 |
| Tensile strength at break, MPa | 13.6 | 13.2 | 12.4 | 13.6 | 7.8 | 12.3 | 4.8 |
| Elongation at break, % | 390 | 380 | 350 | 380 | 250 | 330 | 225 |
| Shore Hardness A, ASTM D2240 | 58 | 58 | 58 | 58 | 57 | 58 | 53 |
| Rebound resilience, ASTM D2632, % | 43 | 41 | 42 | 43 | 34 | 40 | 23 |
| Tear resistance ASTM, D624, kN/m | 107 | 97 | 100 | 111 | 38 | 62 | 18 |

*Scorching time was defined as the time necessary for a 5% increase of compounded rubber viscosity at 120° C.

Examples 1-4 illustrate the current invention.

Example 1 shows that the mixture of TPP and DBU as a devulcanizing agent produces together better properties of secondary rubber than any of them alone (examples 5 and 6), while increasing very important for technology scorching time.

Example 2 shows that even twice lower amount of the mixture of TPP and DBU as a devulcanizing agent gives good mechanical properties of secondary rubber along with even longer scorching time.

Examples 3 and 4 show that this synergistic effect of TPP and DBU appears even at a ratio different from 1:1.

Example 5 shows that TPP is not very effective as a devulcanizing agent, giving relatively low modulus, tear resistance and tensile strength of secondary rubber.

Example 6 proves high effectiveness of DBU as a devulcanizing agent, showing at the same time pretty short scorching time.

Example 7 shows that without a devulcanizing agent a secondary rubber has dismal mechanical properties.

The invention claimed is:
1. A method of devulcanization of sulfur-cured rubber that includes mixing a composition for devulcanization of sulfur-cured rubber with rubber crumbs at a weight ratio of the composition to the rubber crumbs from 1:9 to 1:60, wherein said composition for devulcanization of sulfur-cured rubber contains a devulcanizing agent for selective destruction of sulfide bonds being a mixture which contains 1,8-diazabicyclo[5.4.0]undec-7-ene (DBU) and triphenylphosphine (TPP) at a weight ratio of DBU to TPP from 5:1 to 1:5, and further contains a compatibilizer compatible with both the devulcanizing agent and the sulfur-cured rubber at a weight ratio of the devulcanizing agent to the compatibilizer from 1:15 to 1:70, followed by extrusion of this mixture at 40-120° C.

2. The method according to claim 1, wherein a product of petroleum distillation with a boiling temperature exceeding 250° C. is used as the compatibilizer in the composition for devulcanization of sulfur-cured rubber.

\* \* \* \* \*